US007037026B2

(12) United States Patent
Östling et al.

(10) Patent No.: US 7,037,026 B2
(45) Date of Patent: May 2, 2006

(54) METHOD FOR MOUNTING A SLEEVE ON A SHAFT AND A SLEEVE DEVICE FOR SUCH MOUNTING

(75) Inventors: Sture Östling, Katrineholm (SE); Uno Axelsson, Katrineholm (SE)

(73) Assignee: AB SKF, Goteborg (SE)

( * ) Notice: Subject to any disclaimer, the term of this patent is extended or adjusted under 35 U.S.C. 154(b) by 0 days.

(21) Appl. No.: 10/294,602

(22) Filed: Nov. 15, 2002

(65) Prior Publication Data

US 2003/0094073 A1      May 22, 2003

(30) Foreign Application Priority Data

Nov. 16, 2001   (SE)   .................................... 0103821

(51) Int. Cl.
   *F16B 7/04*   (2006.01)
(52) U.S. Cl. ...................... 403/371; 403/362; 403/367; 403/373; 403/374.1; 384/510; 384/538; 384/541
(58) Field of Classification Search ............. 403/359.1, 403/362, 367, 371, 373, 374.1, 374.2, 374.3, 403/374.4, 409.1; 384/499, 502, 510, 538, 384/537, 541; 29/898.07
   See application file for complete search history.

(56) References Cited

U.S. PATENT DOCUMENTS 2,849,886 A * 9/1958 McCloskey ................. 474/41
3,588,208 A * 6/1971 Kane ........................... 384/541
3,590,652 A * 7/1971 Strang ..................... 403/371 X
3,602,535 A * 8/1971 Behning et al.
3,807,820 A * 4/1974 Schuhmann (Continued)

FOREIGN PATENT DOCUMENTS

EP    0 926 370 A2   6/1999
EP    0 967 404 A2   12/1999
GB      1015970       7/1964

(Continued)

*Primary Examiner*—Daniel P. Stodola
*Assistant Examiner*—Michael P. Ferguson
(74) *Attorney, Agent, or Firm*—Buchanan Ingersoll PC

(57) ABSTRACT

A method for mounting an axially split sleeve provided with an axial slot on a shaft so that a tapering surface on the sleeve cooperates with a tapering bore of a machine member. A flange is axially connected to the sleeve and supports a number of spaced apart tightening devices that are to be urged against the machine member for mutually displacing the machine member and the sleeve to increase the grip between the shaft, the sleeve and the machine member. The method involves positioning the sleeve around the shaft with the annular flange positioned with its tightening devices against the machine member, tightening a first one of the tightening devices which is located at a position diametrically opposite the slot in the sleeve, and thereafter tightening further ones of the tightening devices one by one.

4 Claims, 3 Drawing Sheets

U.S. PATENT DOCUMENTS

| | | | |
|---|---|---|---|
| 3,887,290 A | * | 6/1975 | Taylor |
| 4,304,502 A | * | 12/1981 | Stratienko ............... 403/371 X |
| 4,403,814 A | * | 9/1983 | Koss et al. ................. 384/541 |
| 4,452,547 A | * | 6/1984 | Thiel et al. .............. 403/374.4 |
| 5,011,306 A | | 4/1991 | Martinie |
| 5,039,245 A | * | 8/1991 | Hansen ....................... 403/370 |
| 5,197,345 A | * | 3/1993 | Rose ...................... 403/371 X |
| 5,373,636 A | * | 12/1994 | Martinie ................ 403/371 X |
| 5,489,156 A | * | 2/1996 | Martinie ..................... 384/538 |
| 5,529,403 A | * | 6/1996 | Martinie ................ 384/538 X |
| 6,059,292 A | * | 5/2000 | Firestone |
| 6,152,604 A | * | 11/2000 | Ostling et al. |
| 6,375,383 B1 | * | 4/2002 | Ostling et al. ........... 403/374.3 |

FOREIGN PATENT DOCUMENTS

SE      512 651 C2      4/2000

* cited by examiner

METHOD FOR MOUNTING A SLEEVE ON A SHAFT AND A SLEEVE DEVICE FOR SUCH MOUNTING

FIELD OF THE INVENTION

The present invention generally relates to shaft mounted sleeves. More particularly, the present invention pertains to a method for, mounting an axially, longitudinally split sleeve on a shaft and a sleeve device to be used with such a mounting.

BACKGROUND OF THE INVENTION

Axially split sleeves have been used, for example, to attach machine members, such as wheels, sprockets and bearing inner rings, on shafts or other substantially cylindrical machine elements. An example of this is described in Swedish Patentskrift No. 512 651, the entire content of which is incorporated herein by reference. This document describes a bearing which, via a split sleeve, is attached to a shaft. The outer peripheral surface of the sleeve has a generally tapering saw-tooth-shape. A flange is associated with the sleeve and has axially extending through-holes, each of which receives a set-screw intended to be tightened against a machine member, which in the embodiment shown is a bearing inner race ring having an inner peripheral surface. The tightening of the set-screw causes a mutual axial displacement of the machine member and sleeve, thereby causing an increased grip between the shaft, the sleeve and the machine member.

Experience has shown that the order in which the screws are tightened can have an affect on the performance of the joint because a random tightening under later rotation can result in vibrations in the sleeve which may be somewhat difficult to handle.

SUMMARY OF THE INVENTION

One aspect involves a method for mounting a sleeve having an axially extending slot defining a longitudinally split sleeve on a shaft to cooperate with a machine member, with the sleeve being tapered to cooperate with the machine member having a correspondingly tapering bore. A radially extending annular flange is axially connected to the sleeve and supports a number of circumferentially spaced apart tightening devices to be pressed against the machine member to produce mutual displacement of the machine member and the sleeve to increase the grip between the shaft, the sleeve and the machine member. The method involves positioning the sleeve around the shaft with the annular flange positioned against the machine member, tightening a first one of the tightening devices which is located at a first position located diametrically opposite to the slot in the sleeve to press the first tightening device against the machine member, and thereafter tightening additional ones of the tightening devices, one by one, which are at positions circumferentially spaced from the first position. The method reduces vibrations in the mounted joint during later rotary operation.

According to another aspect, a method for fixing a machine member having a tapering inner bore on a shaft having an outer surface involves positioning a sleeve device around the shaft, with the sleeve device comprising a sleeve and a flange axially engaged with the sleeve. The sleeve is positioned between the outer surface of the shaft and the tapering inner bore of the machine member, and the sleeve has a tapering outer surface cooperating with the tapering inner bore of the mounting member. The sleeve also has a longitudinal slot to define a split sleeve. A plurality of screws are tightened, one by one, into respective through-holes in the flange to press the screws against the machine member and effect mutual displacement of the tapering surfaces of the machine member and the sleeve to increase a grip between the shaft, the sleeve and the machine member. The first of the screws which is tightened is located closest to a position which is diametrically opposite the slot in the sleeve.

Another aspect pertains to a sleeve device adapted to be mounted on a shaft together with a machine member to fix the machine member on the shaft. The sleeve device includes an axially extending sleeve having an axially extending slot defining a split sleeve, with the sleeve having a tapering outer surface adapted to cooperate with an inner tapering surface on the machine member. A radially extending annular flange is axially connected to the sleeve and supports a number of circumferentially spaced apart tightening devices adapted to be urged to press against the machine member for effecting mutual displacement of the machine member and the sleeve to increase a grip between the shaft, the sleeve and the machine member. The sleeve and the flange have cooperating elements which prevent relative angular movements between the sleeve and the flange.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

FIGS. 5–8 schematically illustrate a method for mounting the sleeve device in accordance with the invention.

DETAILED DESCRIPTION

Figure 1:
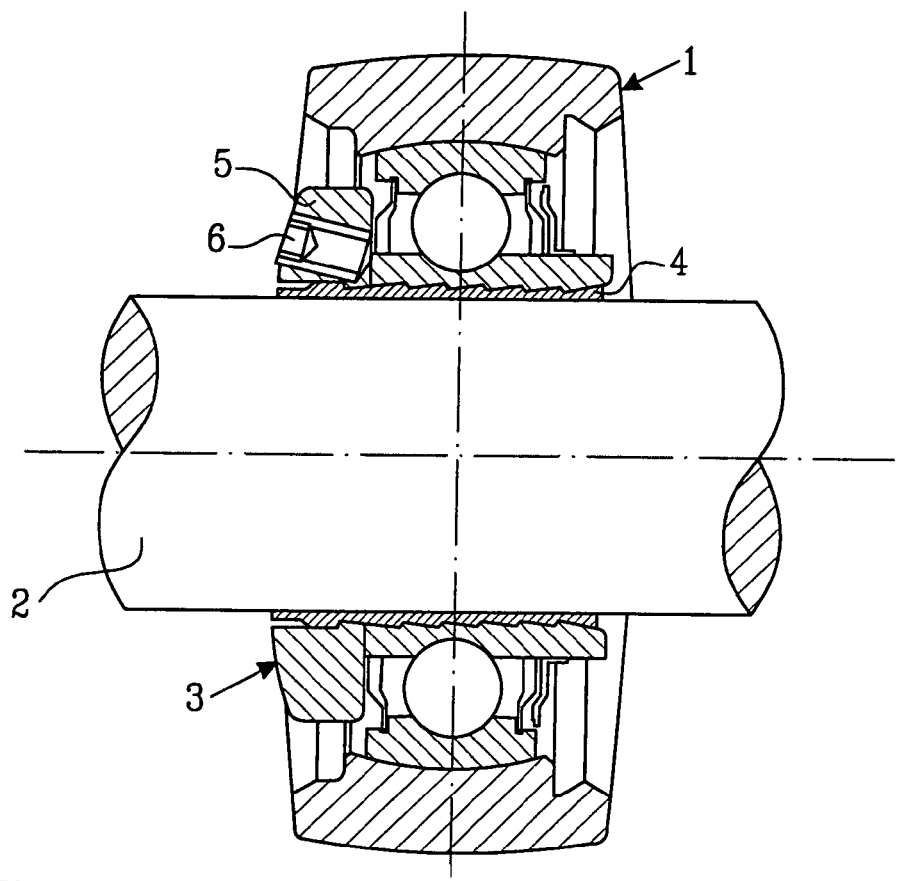
FIG. 1 is a cross-sectional view of a bearing unit attached to a shaft by way of a mounting sleeve device according to the present invention.

FIG. 1 schematically illustrates in cross-section a so called insert bearing 1 attached to a shaft 2 by way of a sleeve device 3. The bearing unit arrangement shown in FIG. 1 is similar to the bearing unit described in Swedish Patentskrift No. 512 651 and includes an inner bearing ring, an outer bearing ring and roller elements arranged between the inner and outer bearing rings as shown in FIG. 1.

The sleeve device 3 includes a sleeve 4 and a radially outwardly extending annular flange 5. In the illustrated embodiment, the sleeve 4 has a tapering outer peripheral or envelope surface which in the illustrated embodiment is defined by a number of consecutively arranged saw-tooth-shaped tapering surface portions. The tapering surface of the sleeve 4 cooperates with a complementary tapering inner bore surface of the inner bearing ring forming a part of the machine member. In the illustrated embodiment, the complementary tapering inner bore surface of the machine part is also defined by saw-tooth-shaped tapering surface portions. Although not specifically shown in FIG. 1, the sleeve 4 is split, preferably with an axially extending slot.

One axial end of the sleeve 4 is axially engaged with or connected to the annular flange 5 which has a larger radial size (e.g., diameter) than the sleeve 4. The flange 5 has several threaded through-holes for receiving tightening devices 6. In the illustrated embodiment, the tightening devices are in the form of set-screws and the through-holes are inclined inwardly relative to the axial direction as illustrated in FIG. 1. The tightening devices 6 are arranged to extend through the through-holes and, upon tightening, press against the machine member that is to be attached to the shaft 2, i.e. the inner bearing ring of the insert bearing 1. This causes an axial displacement between the inner bearing ring and the sleeve 4, which results in an increased grip between the shaft 2, the sleeve 4 and the inner bearing ring due to the mutual motion of the cooperating tapering surfaces.

The cooperating tapering surfaces need not necessarily have a saw-tooth-shape, but each surface can form a single tapering portion. In addition, although the tightening devices 6 are shown as set screws extending through bores or through-holes that are inclined to the axial direction, it is of course possible that the tightening devices can be screws arranged in axially extending bores or other arrangements.

Figure 2:
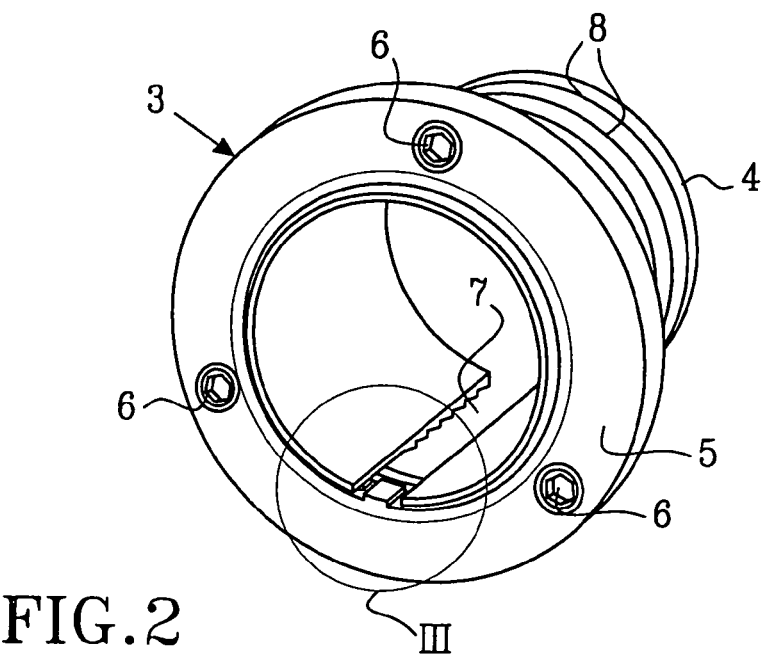
FIG. 2 is a perspective view of the split sleeve and the associated flange.

FIG. 2 is a perspective view of the sleeve device 3 and illustrates the longitudinally or axially extending slot 7 in the sleeve 4 that forms the split sleeve configuration. FIG. 2 also illustrates the series of consecutively arranged saw-tooth-shaped surface portions 8 on the outer surface of the sleeve 4. In addition, in the illustrated embodiment, the annular flange 5 has three tightening devices or screws 6 arranged at evenly space circumferential intervals.

Figure 3:
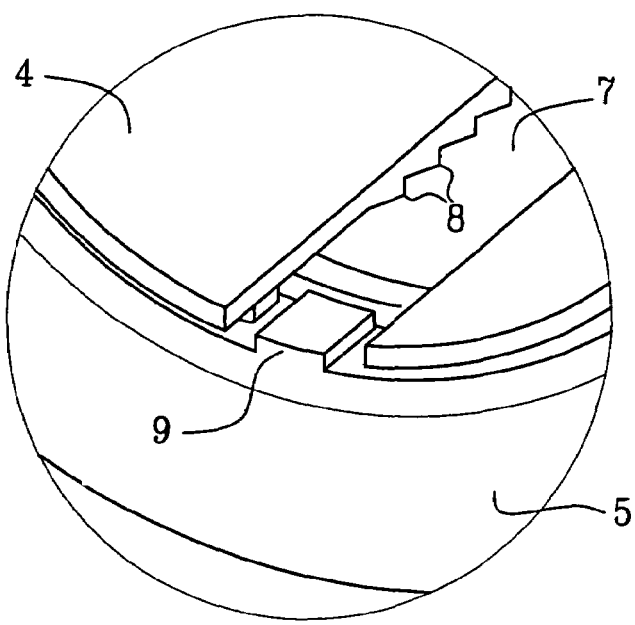
FIG. 3 is an enlarged detailed perspective view of the circled portion of the sleeve and flange designated III in FIG. 2.

As better illustrated in the FIG. 3 detailed view of a portion of the sleeve device 3, the inner edge of the annular flange 5 has a flat nib, tab or projection 9. This flat nib 9 projects inwardly and is positioned in the slot 7, thereby limiting the possibility that the sleeve 4 and the flange 5 will move in the circumferential direction relative to each other. In this embodiment, the flat nib 9 is positioned diametrically opposite to one of the tightening devices 6. This positioning of the flat nib 9 helps ensure that one of the three tightening devices 6 will not be situated at the position of the slot 7.

Figure 4:
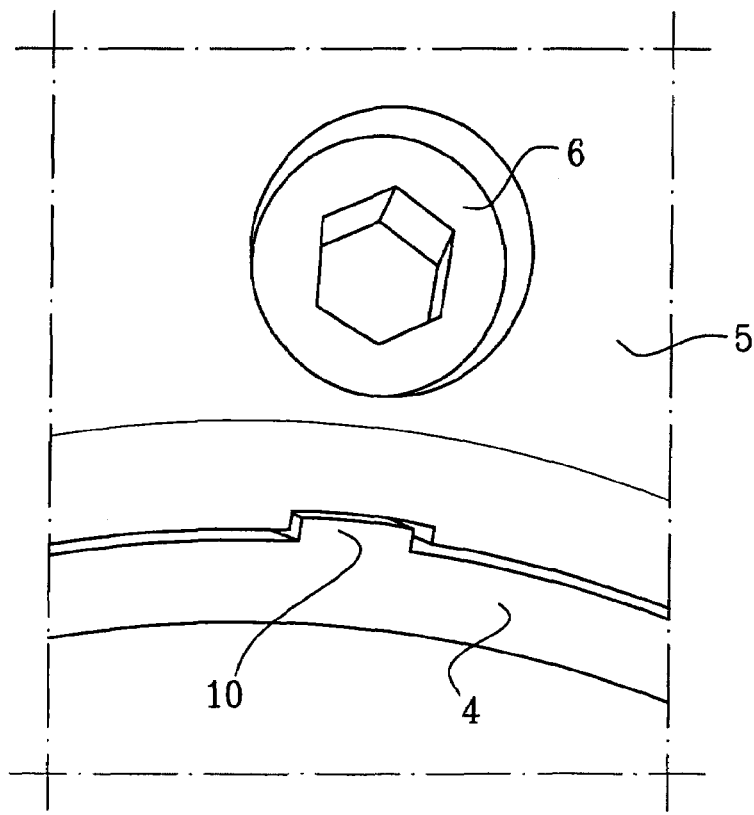
FIG. 4 is a detailed end view of a part of the sleeve and flange according to an alternative embodiment of the sleeve device.

FIG. 4 is a detailed view of a portion of the sleeve device 3 according to an alternative embodiment. In this embodiment, the sleeve 4 and the flange 5 are prevented from experiencing more than very small mutual movements in the circumferential direction by virtue of a flat nib, tab or projection 10 projecting radially outwardly from the surface of the sleeve 4. This radially outwardly projecting flat nib 10 is positioned in a recess 11 in the inner edge of the annular flange 5. As can be seen, the recess 11 is positioned adjacent or in circumferential alignment with one of the tightening devices 6.

Although both illustrated embodiments of the sleeve device are equipped with interacting mechanisms for preventing free angular movement of the sleeve and the flange relative to each other, it is not necessary that such mechanisms be provided, although the provision of a nib entering into the slot of the sleeve or into a recess in the flange helps facilitates the handling of the sleeve device during mounting operations.

Figure 5:
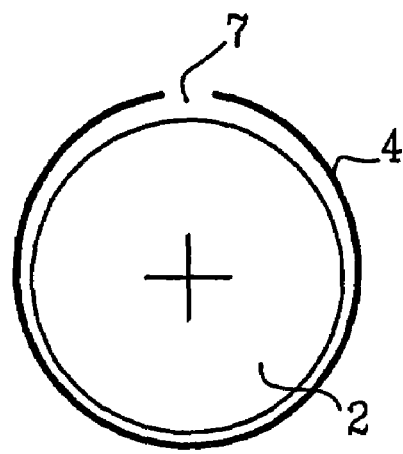

FIGS. 5–8 schematically illustrate four consecutive steps associated with the mounting operation. FIG. 5 shows the initial position, with the shaft 2 in cross-section, and the sleeve 4 arranged about the shaft so that the slot 7 in the sleeve 4 faces upwards. It is to be understood that the other features and details illustrated in FIG. 1 such as the machine member are not illustrated in FIGS. 5–8 for purposes of simplifying the illustration and description. For example, it is recognized that the sleeve device 3 is positioned around the shaft 2 so that the sleeve 4 is between the outer surface of the shaft and the tapering inner bore of the machine element.

Figure 6:
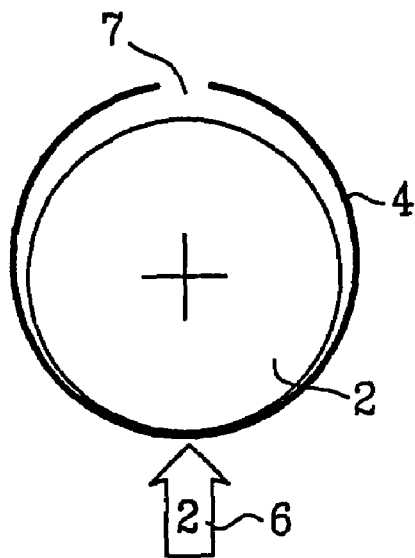

FIG. 6 illustrates the first step of the mounting operation. Here, the first tightening device 6 is applied at a position diametrically opposite to the slot 7. The tightening device 6 is illustrated as an arrow marked with a reversed 2, although this mode of illustration is chosen only for purposes of simplification, it being understood that the tightening device 6 is, in the disclosed embodiment, preferably a set screw as illustrated in FIGS. 1–4 and has a longitudinal direction substantially in the axial direction of the shaft 2.

Figure 7:
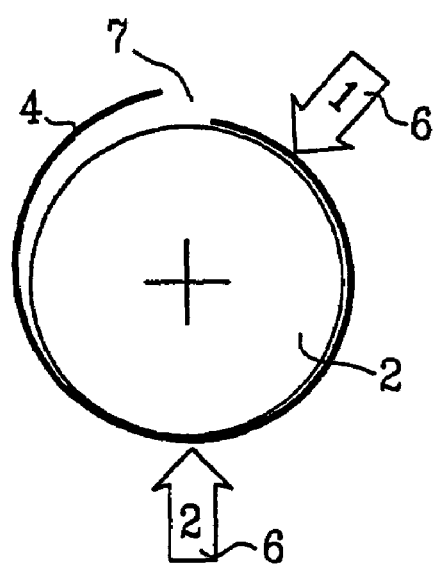

FIG. 7 illustrates the next step in the mounting operation in which a second tightening device 6, marked as arrow 1, is applied. Similar to the illustration in FIG. 6, the arrow shown in FIG. 7 represents a set-screw or other appropriate tightening device which is positioned in the same manner as shown for example in FIG. 2.

Figure 8:
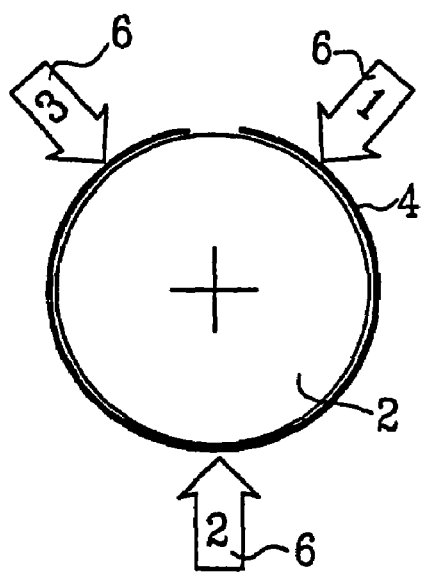

In the last step shown in FIG. 8, a third tightening device 6, represented by the arrow 3, is applied in the same manner, and the mounting is then completed.

It has been found, quite surprisingly, that the relatively severe and problematic vibrations earlier experienced with a mounting of this kind, when the machine member after mounting was subjected to rotation, has been appreciably reduced when the mounting sequence has been performed in accordance with the steps illustrated in FIGS. 5–8. This substantially improved effect is also clearly perceptible at high rotational speeds.

It has also been found that one of the more important steps in the mounting method is that the first tightening device 6 is applied at a position which is diametrically opposed to the slot 7 in the split sleeve 4. Of course, diametrically opposite is also understood to include positions which may not be precisely diametrically opposite the slot, but are slightly spaced from such position. The order in which the other tightening devices 6 (e.g. the other two tightening devices) are applied is not necessarily critical, and no significant provable differences have been found if either of the tightening devices 6 marked by arrow 1 or arrow 3 is mounted after the one tightening device 6 (i.e., the tightening device 6 indicated by the arrow with a reversed 2) is provided diametrically opposite to the slot 7.

As described above, the sleeve 4 and the flange 5 have cooperating features or elements for preventing their mutual angular movement relative to each other except for a very short movement amount permitted by the play between the cooperating features. By virtue of this limited mutual mobility in the circumferential direction, it is possible to ascertain that the position of the first tightening device 6 is not mistakenly angularly displaced by from its desired position opposite to the slot in the sleeve by more than a few degrees.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A sleeve device adapted to be mounted on a shaft together with a machine member to fix the machine member on the shaft, comprising:

an axially extending sleeve having an axially extending slot defining a split sleeve, said sleeve having a tapering outer surface adapted to cooperate with an inner tapering surface on the machine member;

a radially extending annular flange separate from but axially connected to the sleeve and supporting a number of circumferentially spaced apart tightening devices adapted to be urged to press against the machine member for effecting mutual displacement of the machine member and the sleeve to increase a grip between the shaft, the sleeve and the machine member;

the sleeve and the flange having cooperating elements which prevent relative angular movements between the sleeve and the flange; and the cooperating elements including a tab extending from the annular flange which is received in the slot in the sleeve.

2. The sleeve device according to claim 1, wherein the tightening devices are screws each positioned in a respective through-hole in the flange.

3. The sleeve device according to claim 2, wherein one of the through-holes in the flange is positioned diametrically opposite the slot in the split sleeve.

4. A sleeve device adapted to be mounted on a shaft together with a machine member to fix the machine member on the shaft, comprising:

an axially extending sleeve having an axially extending slot defining a split sleeve, said sleeve having a tapering outer surface adapted to cooperate with an inner tapering surface on the machine member;

a radially extending annular flange axially connected to the sleeve and supporting a number of circumferentially spaced apart tightening devices adapted to be urged to press against the machine member for effecting mutual displacement of the machine member and the sleeve to increase a grip between the shaft, the sleeve and the machine member;

the sleeve and the flange having cooperating elements which prevent relative angular movements between the sleeve and the flange; and wherein the cooperating elements include a tab projecting radially inwardly from an inner edge of the annular flange and projecting into the slot to prevent relative angular movement between the sleeve and the flange.

* * * * *